R. HOFFHEIN.
HORSE HAY-RAKE.

No. 178,775. Patented June 13, 1876.

Attest:
C. Clarence Poole
J. S. Brown.

Inventor:
Reuben Hoffhein
By his Atty R.D.O. Smith

UNITED STATES PATENT OFFICE.

REUBEN HOFFHEIN, OF YORK, PENNSYLVANIA.

IMPROVEMENT IN HORSE HAY-RAKES.

Specification forming part of Letters Patent No. 178,775, dated June 13, 1876; application filed April 5, 1876.

*To all whom it may concern:*

Be it known that I, REUBEN HOFFHEIN, of York, county of York, and State of Pennsylvania, have invented new and useful Improvements in Horse-Rakes, of which the following is a full and exact description:

This invention relates to that class of horse hay-rakes known as "sulky" or "wheeled" rakes; and it consists, first, in an axle divided at its middle, each part fixed in its wheel, and connected at the center by spring ratchet-clutches of peculiar structure, with a pinion or ratchet-wheel to operate mechanism for raising the rake-teeth; second, in mounting the parts of said axle inclined to the vertical plane sufficiently to adjust the wheels with spokes upright; third, in the latch, latch-spring, and ratchet, whereby the rake-teeth are raised to liberate the gathered hay as often as desirable; fourth, in an adjustable release-plate, whereby the latch is automatically disengaged from the ratchet, and the rake-teeth permitted to drop again to the ground; fifth, in the angle-irons or knee-plates to adjust the axis-rod for the teeth above the axle.

That others may fully understand my improvement, I will particularly describe it, having reference to the accompanying drawings, wherein—

Figure 1:
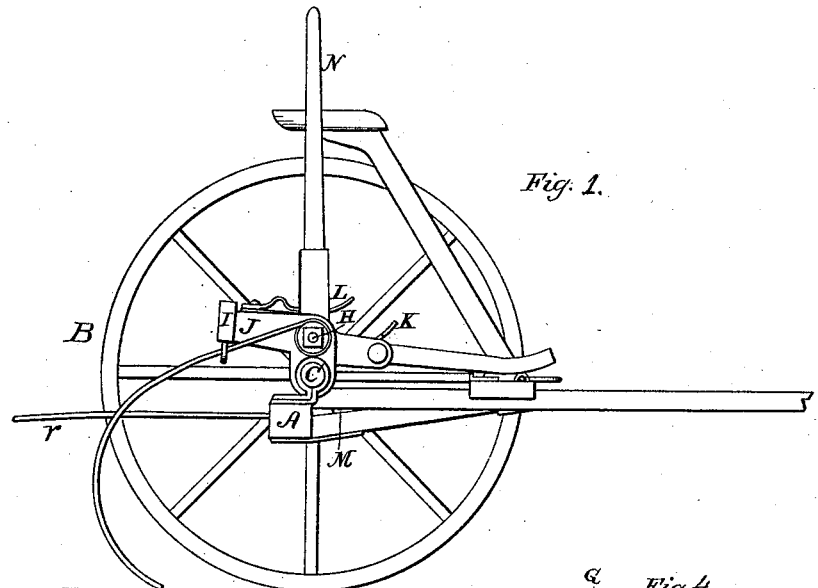
Figure 4:
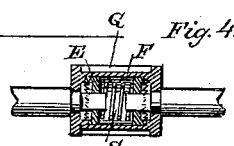
Figure 2:
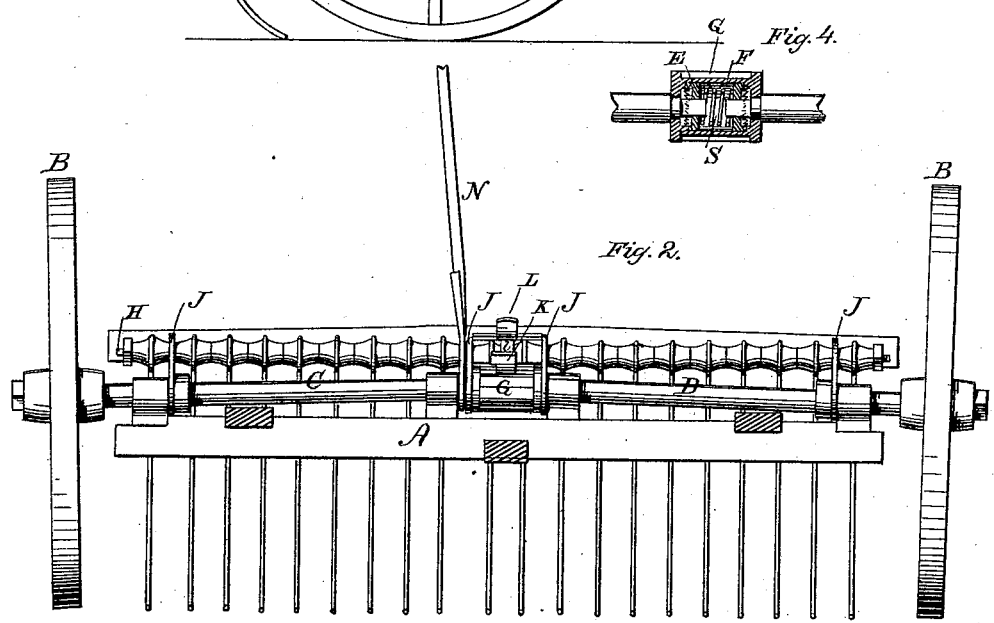
Figure 3:
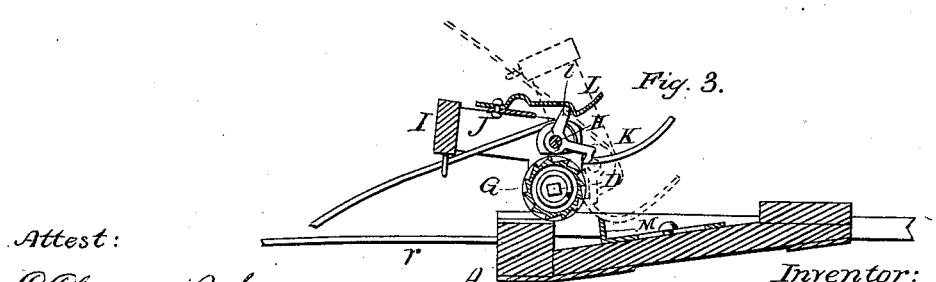

Figure 1 is an end elevation of my machine with the rear wheel removed. Fig. 2 is a front elevation of the same. Fig. 3 is a longitudinal section of the central portion through the axle. Fig. 4 is a longitudinal section of the central coupling-ratchet.

A is the main frame of my rake, having the ordinary shafts for the attachment of the horse, a seat for the driver, and elastic wire teeth and clearers, as usual. These parts, being common, require no further description. The wheels B B are rigidly attached to the outer ends of the divided axle C D, the adjacent ends of which are connected by spring ratchet-clutches E F within a central hollow ratchet or pinion, G, so that either or both wheels may be drivers as they revolve forward, but may revolve backward without hinderance. The ratchet G is hollow and cylindrical in form, and the plates which form its ends have upon their inner faces radial ratchet-teeth. The ends of the axle C D turn freely in these end plates, but carry with them in their revolution counter ratchet-plates E E, which are free to move endwise only on said axle. A spring, S, placed between the plates E E, force them apart and into engagement with ratchet-teeth of the end plates. This arrangement enables either or both wheels to be drivers of the ratchet G, and also permits a free revolution backward of either wheel. The axles C D are mounted in boxes bolted to the top of the frame A, and there is also mounted upon said axle the spring-tooth frame, composed of the axis-rod H and staple-bar I and angle-plates J, which connect said parts at their ends, and also connect them to the axle C D, which passes through said angle-plates at their ends. The axis-rod H is thereby located above the axle C D. A hook-pawl, K, is mounted upon the center of the rod H immediately over the ratchet G, and it is held up out of an engagement with said ratchet by a spring, L, which bears upon a projecting arm or stud, *l*, properly located upon said pawl for that purpose.

When it is desired to raise the rake-teeth and liberate the gathered hay, said pawl is depressed and the stud *l* slips under the bearing-point of the spring, which then acts to hold the pawl down until again forcibly raised and restored to its former position. The ratchet G is in constant rotation with the shafts C D, and as soon as the pawl K has gone into engagement therewith the rod H and tooth-frame are pulled over, moving upon the axle as an axis, and thus raising the points of the teeth from the ground and liberating the gathered hay. The pawl K remains in engagement with the pawl G until the front end of said pawl engages with the release-plate or tripper M, which is adjustable upon the frame A, whereupon the weight of the teeth causes them to descend again to the ground. A hand-lever, N, is also attached to the tooth-frame, so that it may be operated by hand in case of some sudden emergency, or if the automatic mechanism is at any time disabled. The frame A is suspended below the axle, because thereby the tooth-frame is unobstructed in its movements by the presence of the frame, the driver's seat and the whole center of gravity are brought nearer the ground, and the clearer-rods *r* may be inserted directly into the rear bar of the frame, instead of requiring a separate bar for that purpose.

Having described my invention, what I claim as new is—

1. A sulky horse-rake provided with wheels fixed to an axle divided at its middle, and connected there by a ratchet, G, constructed with ends having radial ratchet-teeth on their interior surfaces, and provided with corresponding ratchet-disks E, which are mounted upon and revolve with the ends C D of the axle, and a spring, S, to keep said disks in operative position, combined with a hook-pawl, K, or other equivalent device, whereby the rotation of said ratchet may be caused to automatically lift the rake-teeth, as and for the purpose set forth.

2. A sulky horse-rake provided with a tooth-frame jointed to the main frame, and automatically raised by the rotation of the main axle, combined with a main axle divided at its middle, and set inclined downward toward its outer ends, so as to incline the wheel sufficiently to make the lower spokes vertical, or nearly so.

3. The axle C D, combined with a ratchet, G, and pawl K, connected with the tooth-frame rod H and the double-acting spring L, as set forth.

4. The ratchet G, pawl K, and spring L, combined with the adjustable tripper-plate M.

5. The angle-plate J, forming parts of and supporting the tooth-frame upon and above the axle C D as a center.

REUBEN HOFFHEIN.

Witnesses:
R. D. O. SMITH,
C. CLARENCE POOLE.